Dec. 9, 1952

I. R. VERSOY ET AL 2,620,791

VALVE STRUCTURE

Filed Jan. 22, 1945

Inventors
Irving R. Versoy
and Anthony D. Rapuano
By Rockwell & Bartholow
Attorneys Dec. 9, 1952 I. R. VERSOY ET AL 2,620,791
VALVE STRUCTURE
Filed Jan. 22, 1945 3 Sheets-Sheet 2

Inventors
Irving R. Versoy
and Anthony D. Rapicano
By Rockwell-Bartholow
Attorneys Dec. 9, 1952     I. R. VERSOY ET AL     2,620,791
VALVE STRUCTURE Filed Jan. 22, 1945     3 Sheets-Sheet 3

Inventors
Irving R. Versoy
and Anthony D. Rapuano
By Rockwell + Bartholow
Attorneys Patented Dec. 9, 1952

2,620,791

UNITED STATES PATENT OFFICE 2,620,791

VALVE STRUCTURE

Irving R. Versoy and Anthony D. Rapuano, New Haven, Conn.; said Versoy assignor to The Berger Brothers Company, New Haven, Conn., a corporation of Connecticut, and said Rapuano assignor to Robertshaw-Fulton Controls Company, a corporation of Delaware Application January 22, 1945, Serial No. 573,932

11 Claims. (Cl. 128—1)

This invention relates to a fluid pressure control mechanism arranged to control the delivery of fluid such as air, for example, to a given receptacle in such a manner that the fluid will be delivered to the receptacle to place the latter under pressure under given conditions, and that regulation of this pressure will be effected both as to the initial pressure obtaining in the receptacle when the fluid is delivered thereto and also as to the building up of additional pressure within the receptacle under certain conditions.

Although the invention is capable of various applications, as shown and described herein, it is applied to a valve structure for use in controlling and regulating the admission of pressure of air to suits worn by aviators to prevent the injurious effects resulting to the pilot or passengers from sudden changes in speed and direction of an airplane. As the invention is not limited to this particular application, the present description serves to illustrate and disclose one preferred use thereof.

It is well known that sudden changes in the speed and direction of an airplane and particularly changes in direction such as that which occurs when an airplane is brought out of a dive, for example, bring about injurious effects to the pilot or passengers of the plane, and it has been proposed to protect such persons by the use of suits worn by them which will be provided with inflatable bladders or the like to which air may be admitted to exert pressure upon certain parts of the body. It is desirable that this pressure be exerted only when necessary and that the bladders be deflated under ordinary conditions of flying when the pressure is not needed.

It is also desirable that the delivery of air to the bladder or other receptacle be under automatic control so that inflation of the bladder or suit will take place automatically, and it is also desirable that the degree of pressure delivered be varied according to the variation in centrifugal force accompanying changes in the direction or speed of the plane.

In brief, although variation is possible in this respect, it is considered desirable to admit air under a given amount of pressure to the aviator's suit when the centrifugal force to which the plane is subjected reaches a given minimum value, and to increase this pressure in proportion to the increase in centrifugal force above the given minimum so that as the centrifugal force increases, the pressure in the suit will correspondingly build up or increase. Also it is desirable that the suit be immediately deflated when conditions of flying are such that the aviator is no longer subjected to the action of centrifugal force so that pressure is no longer needed in the suit, the reduction in pressure being also effected in proportion to the decrease in centrifugal force and, when the latter reaches a given minimum, the suit will be vented to the atmosphere.

One object of the invention is to provide a valve structure comprising a controlling mechanism and a regulating mechanism, the controlling mechanism serving to control the delivery of a fluid under pressure to the regulating mechanism, and the regulating mechanism serving to control the delivery of air to a receptacle so that the pressure in the latter will vary according to varying conditions.

A still further object of the invention is to provide a controlling and regulating mechanism of the character described such that air or fluid under a given pressure will be conveyed to a point of delivery when the value of the centrifugal force to which the mechanism is subjected reaches a given minimum figure and be varied according to the value of the centrifugal force above this minimum value while cutting off such delivery as quickly as the value of the centrifugal force falls below the predetermined amount.

A still further object of the invention is to provide a pressure control mechanism of the character described such that air under pressure, for example, may normally be employed to pressurize a given receptacle such as a gasoline tank, for example, and under certain conditions be diverted from this use for delivery to another receptacle such as the bladder of an aviator's suit, for example, while varying the pressure of the air delivered in the latter case according to conditions encountered by the wearer of the suit.

A still further object of the invention is to provide a mechanism for delivering air or other fluid under pressure to a plurality of points of delivery and varying the pressure of the fluid so delivered in such a manner that the pressure of air delivered at each point may be varied according to given conditions and also varied with respect to that delivered at the other points.

To these and other ends the invention consists in the novel features and combinations of parts to be hereinafter described and claimed.

Figure 1:
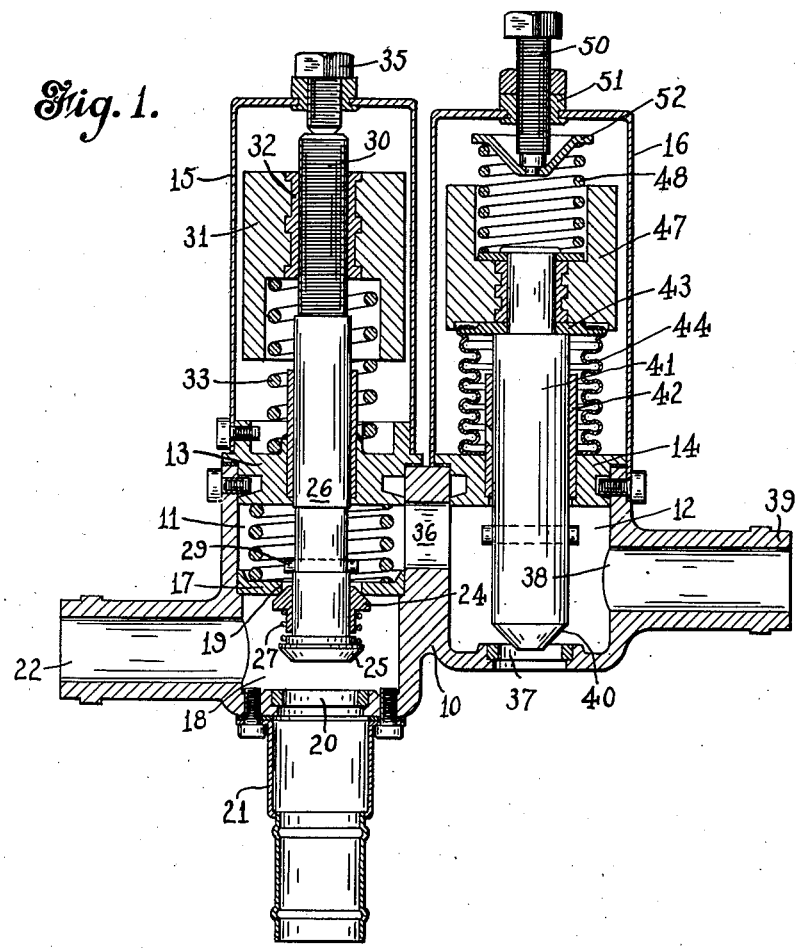
Fig. 1 is a sectional view of a pressure control mechanism embodying our invention.
Figure 2:
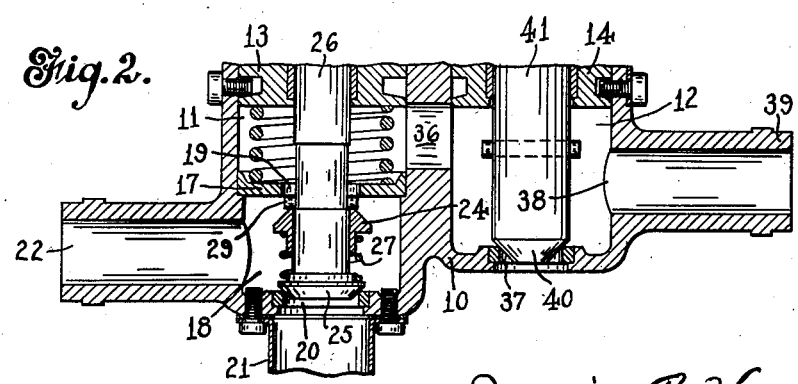
Fig. 2 is a fragmentary sectional view of the control mechanism showing the parts in another position.

To illustrate one embodiment of our invention, we have shown in Figs. 1 and 2 of the drawings a valve casing designated generally by the numeral 10, the casing being provided with chambers 11 and 12. Above these chambers are partitions 13 and 14 upon which are supported sealing caps 15 and 16.

The chamber 11 is separated by a partition 17 from a lower chamber 18, the partition 17 having provided therein a port 19 providing communication between the chambers 11 and 18. A second port 20 is provided at the lower portion of the chamber 18, this port as shown being in alignment with the port 19, and from the port 20 leads a pipe or duct 21 which may lead to any place where it is desired to convey fluid pressure such as a gas tank, for example, or it may lead directly to the atmosphere if it is merely desired to vent the chamber 18. In the form of the invention shown, however, it will be assumed that the duct 21 leads to the gas tank of an airplane to pressurize or put under pressure the gas in the tank.

Inlet means in the form of a pipe 22 is provided for the chamber 18, it being understood that fluid such as air, for example, will be admitted to the chamber through such inlet. The ports 19 and 20 are controlled respectively by valves 24 and 25, the valve 25 being secured to the lower end of a valve stem 26 slidably mounted in the partition 13 while the valve 24 is slidably mounted upon this stem and is urged toward the port 19 or away from the valve 25 by a spring 27 acting between the two valves. It will be seen, therefore, that the spring 27 normally tends to hold the valve 24 against the seat in the partition 17 closing the port 19.

An abutment in the form of a pin 29 is secured in the valve stem 26 above the valve 24, which abutment is adapted to pass through the port 19 and engage the valve 24 when the stem is moved downwardly from the position shown in Fig. 1 and move this valve from its seat to open the port 19 as shown in Fig. 2.

The valve stem 26 also extends upwardly through the partition 13 into the cap 15 and at its upper end is screw-threaded as shown at 30 to threadingly receive thereon a weight 31 by means of an internally screw-threaded sleeve 32 secured to the weight so that the latter may be adjusted on the stem. Acting between the weight 31 and the partition 13 is a compression spring 33 normally urging the valve stem 26 upwardly so as to maintain the valve 25 away from its seat in the lower end of the chamber 18 and, therefore, normally maintain the port 20 in open position. The tension of this spring may be adjusted by adjustment of the weight 31 on a threaded end of the stem. A stop screw 35 is adjustably mounted at the upper end of the cap 15 to serve as an abutment or stop for the upper end of the valve stem to limit the upward movement thereof.

The chamber 11 is provided with a port 36 which in the form of the invention now being described provides communication with the chamber 12, and it will be apparent that the valve mechanism heretofore described is designed to permit air or other fluid under pressure which enters the chamber 18 through the inlet 22 to pass downwardly through the outlet pipe 21 when the parts are in the position shown in Fig. 1 or to pass upwardly through the port 19 and through the port 36 into the chamber 12 when the parts are in the position shown in Fig. 2. Thus the position of the valves 24 and 25 determine whether the pressure fluid entering the chamber 18 is delivered to the gas tank, for example, through the pipe 21 or diverted into the chamber 12 for use in another relation.

It will also be noted that the spring 33 is normally of sufficient strength to overcome the downward force exerted by the weight 31 under normal conditions, that is, under the normal value due to gravity but, that when the mechanism is subjected to centrifugal force acting in a downward direction as the mechanism is shown in Fig. 1, the additional pull of this centrifugal force on the weight 31 will overcome the force of the spring 33 and move the valve stem 26 downwardly to seat the valve 25 on the port 20 and thus close this outlet port. When this occurs, the pin 29 will engage the valve 24 moving this valve from its seat and thus opening port 19 to permit fluid pressure in the chamber 18 to pass into the chamber 12 through the port 36. Thus the fluid under pressure may be diverted from the outlet pipe 21 to the chamber 12 when the centrifugal force to which the mechanism is subjected reaches a given value, and this value may be adjusted or predetermined by adjustment of the spring 33.

The chamber 12 is provided with a vent port 37 and an outlet port 38 from which leads a duct or pipe 39 at a point of delivery which, if the device is used in connection with an aviator's suit, will be a bladder or bladders to be inflated within the suit. This outlet pipe 39 may, of course, lead to any desired point of delivery where the fluid under pressure is to be used.

The vent port 37 is controlled by a valve 40 at the lower end of a stem 41 which passes upwardly through a sleeve 42 secured in the partition 14 and has secured adjacent its upper end a plate 43 constituting the upper wall of a collapsible bellows 44, the lower end of which is secured to the partition 14.

It will be understood that the stem 41 fits relatively loosely within the sleeve 42 so that air, for example, in the chamber 12 may pass upwardly about the stem into the bellows 44. The plate 43 being connected to the stem, it will be apparent that the pressure of the air in the chamber 12 will upon entering the bellows tend to raise the valve 40 from its seat about the port 37. With the above construction it will be apparent that the position of the valve 40 will depend upon whether or not the pressure obtaining in the chamber 12 and to which the bellows 44 is subjected will be sufficient to overcome the weight which may be applied to the bellows and the tendency of the bellows to resist expansion. For example, when the air pressure in chamber 12 reaches such a value that this pressure applied over the effective area of the bellows 44 overcomes the resistance of the bellows to expansion and any weight or force which may be applied to the bellows, the valve 40 will be opened and the chamber 12 vented to the atmosphere. Thus the pressure in chamber 12 will be maintained below a certain maximum depending upon the downward force exerted upon the bellows as, when the upward force exerted upon the stem 41 by the bellows overcomes this downward force, the valve 40 will be opened. This upward force is, of course, the product of the pressure obtaining in the chamber 12 and the effective area of the bellows 44.

Upon the upper end of stem 41 is provided a weight 47 so that this weight is carried by the valve stem. It will be understood that under conditions of rest, the weight 47 is subject to the force of gravity and, therefore, only a force due to the effect of gravity on this weight will be exerted downwardly on the stem 41 in a direction to seat the valve 40. However, if the mechanism is subjected to the action of centrifugal force acting in a direction to move the weight toward the chamber 12, the force exerted by the weight will be increased and that variation in this force will be proportional to the increase or decrease in the value of centrifugal force acting upon the weight. Thus, depending on the value of centrifugal force to which the weight is subjected, the amount of pressure in chamber 12 necessary to raise the valve 40 from its seat and vent this chamber to the atmosphere will be varied. Therefore, the air in the chamber 12 will be maintained at a predetermined pressure depending upon the value of centrifugal force to which the weight is subjected and this pressure will also obtain in the aviator's suit or other receptacle connected to the delivery pipe 39.

Also acting upon the weight 47 is a compression spring 48, the tension of which may be adjusted by an adjusting screw 50 threaded into a nut 51 secured in the top of the casing 16, this screw acting upon a cap 52 seated upon the spring 48. This spring normally acts downwardly on the bellows and valve in addition to the weight 47. The purpose of the spring 42 is to enable the variation, if required, by adjustment of this spring of the pressure of the air initially admitted to the aviator's suit when the centrifugal force to which the mechanism is subjected reaches a given value. For example, it may be desired to begin inflation of the aviator's suit when he is subjected to centrifugal force producing an acceleration equal to 2g or twice that due to gravity. In some instances, it may be desired to have the suit inflated with one and one-half pounds of air pressure at this time and, in other instances, it might be desired that this initial pressure be two or more pounds. This variation of the initial pressure admitted to the suit through the delivery means 39 may be effected by adjustment of the tension of the spring 48 by means of the adjusting screw 50 so that the initial inflation pressure admitted to the suit may be controlled and set at any desired point. Obviously, any increase in centrifugal force above this initial value will effect corresponding increase of pressure admitted to the suit. Likewise, when the value of centrifugal force decreases, it will require less pressure in the chamber 12 to actuate the bellows to raise the valve 40 and, therefore, the pressure obtaining in the chamber 12 and the suit will be decreased accordingly.

The operation of the mechanism thus far described is as follows: The normal position of the valves is that shown in Fig. 1 of the drawings as the various forces acting upon the valve stems 26 and 41 will be so arranged as to maintain the valves in this position under normal conditions of flying, for example, when the mechanism is subjected to little or no centrifugal force. If compressed air is admitted to the chamber 18 through the inlet tube 22, this air will be vented through the port 29 and may be carried by the tube 21 to any desired point such as the gasoline tank, for example, if it is desired to pressurize the tank. When, however, a change in velocity or direction subjects the mechanism to centrifugal force of sufficient value (depending upon the weight 31 and the setting of the spring 33) to move the valve stem 26 downwardly, the valve 25 will be carried with it and, when it approaches the port 29, will be snapped downwardly upon its seat by a sharp action to a fully closed position. During the latter part of the descent of the valve stem 26, the abutment or pin 29 will engage the upper surface of valve 24 and move it downwardly to open position, the spring 27 having held this valve against its seat during the initial part of the descent of the stem. This is the position shown in Fig. 2 and at this time compressed air in the chamber 18 may flow through the port 19 and passage 36 into the valve chamber 12.

The valve stem 41 is also normally in the position shown in Fig. 1 and when compressed air is admitted to the chamber 12 by the opening of valve 24, this air would normally be vented through the port 37 to the atmosphere, as the resistance of the bellows to further closing opposes the weight 47 and the spring 48. At this time also any pressure which may exist in chamber 12 will act upon the bellows 44 and also tend to hold the valve 40 off its seat.

However, when the weight 47 is subjected to the action of centrifugal force sufficient to overcome the forces acting upwardly on the valve 40, this valve will also be closed, thus directing the pressure fluid in chamber 12 through duct 39 to a point of delivery such as an aviator's suit for example. Moreover, it will be apparent that the air pressure existing in chamber 12 and, therefore, the pressure delivered through the outlet 39 will vary according to the variation in centrifugal force as the valve 40 will be kept in balance by the forces acting thereon in opposite directions. As the pressure in the chamber 12 increases, it will exert an increased force on the valve 40 in an opening direction through the action of bellows 44, thus tending to open the port 37 and vent the air therefrom to lower the pressure in the chamber 12, thus keeping the pressure in this chamber practically constant as long as there is no variation in the centrifugal force to which the mechanism is subjected. The degree of pressure obtaining in chamber 12 for any given value of centrifugal force may, of course, be predetermined by the adjustment of the spring 48.

If the action of centrifugal force increases, there will be a corresponding increase in the forces acting on the valve 40 to close it and this will result in increased pressure in chamber 12 and increased pressure delivered to the aviator's suit through the tube 39.

If a change in flying conditions occurs so that the mechanism is no longer subject to the action of centrifugal force, the valve 40 will be opened by pressure in the chamber 12 and likewise the valve 24 will be closed and the valve 25 opened so that no air under pressure will be delivered to chamber 12 and the air in this chamber and in the aviator's suit will vent to the atmosphere through port 37 thus restoring the parts of the mechanism to their normal positions and restoring the aviator's suit to its normal deflated position.

It will be seen, therefore, that this mechanism will serve to maintain the aviator's suit normally in deflated condition but will admit air to the suit when subjected to centrifugal force of a predetermined value. Moreover, the degree of pressure obtaining in the suit at this predetermined value of the centrifugal force will be regulated by the regulating valve 40 and can be predetermined by adjustment of the parts by the adjusting screw 50 so that at a certain minimum value for the centrifugal force to which the mechanism is subjected, a given pressure will obtain in the aviator's suit.

It will also be apparent that as the centrifugal force increases, the pressure in the suit will correspondingly increase and, as the centrifugal force decreases, the pressure will correspondingly decrease until when the value of centrifugal force reaches a given minimum, the suit will again be deflated.

Figure 3:
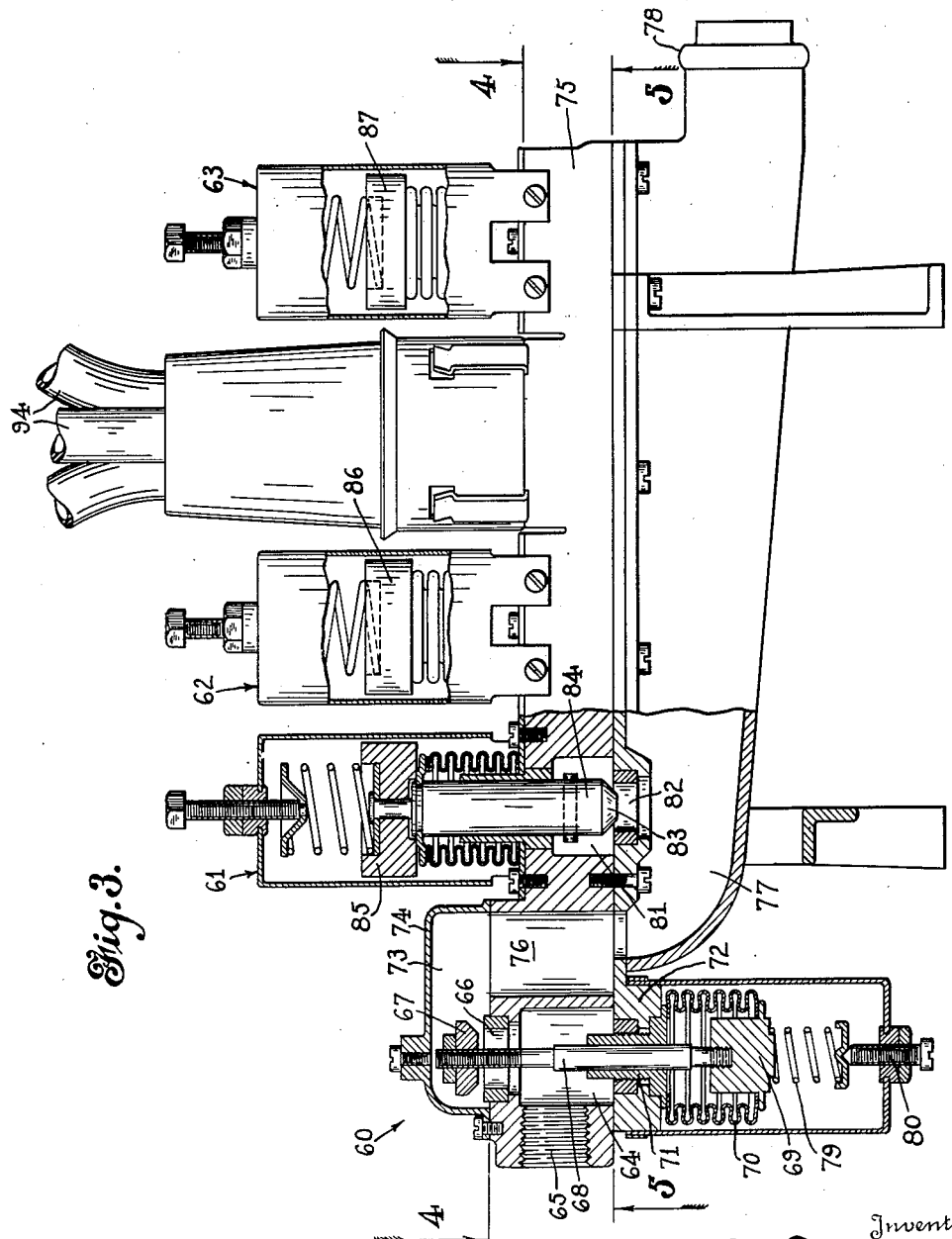
Fig. 3 is a side elevational view partly shown in section of a modified form of our invention.
Figure 4:
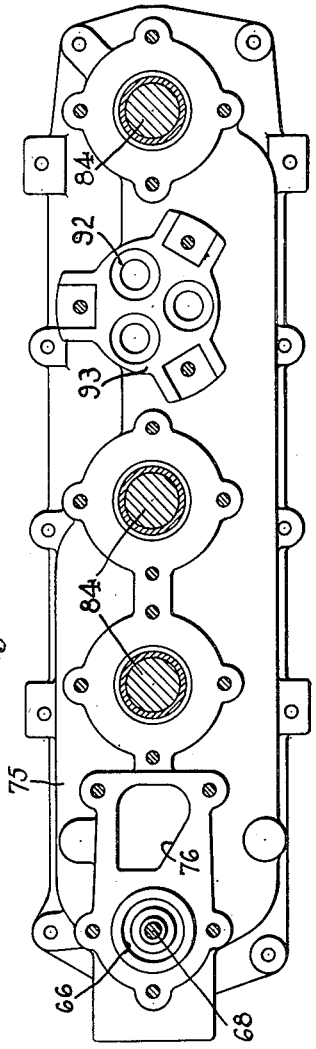
Fig. 4 is a sectional view taken substantially on line 4—4 of Fig. 3.
Figure 5:
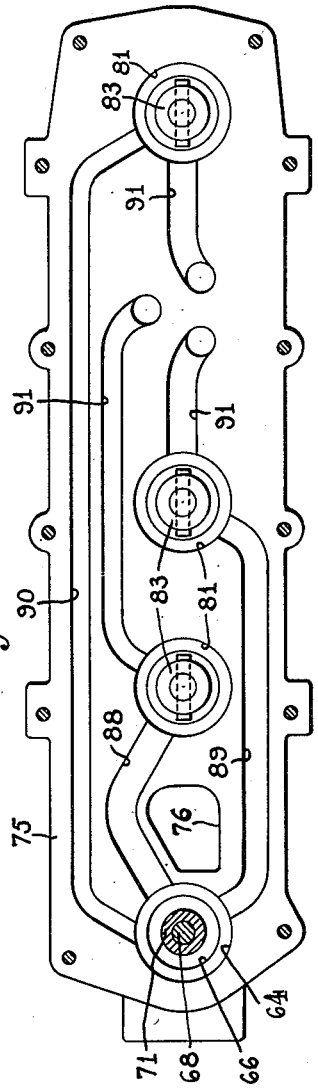
Fig. 5 is a sectional view taken on line 5—5 of Fig. 3.

In Figs. 3, 4 and 5 of the drawings, a modification of the invention is illustrated. In some instances it is desirable to deliver air under regulated and variable pressures to a plurality of points instead of a single point as illustrated in Figs. 1 and 2 of the drawings. For example, in connection with the protection of the pilot of an airplane it may be desirable to deliver air under pressure to several parts of his suit and to regulate the pressure in each of the parts individually or independently of the pressure obtaining in the other parts. For example, the aviator's suit may be provided with three or more separate bladders and it may be desired that each of these bladders be inflated with a given amount of pressure regardless of the pressure obtaining in the other bladders. The structure shown in Figs. 3 to 5 of the drawings is designed to effect this result and is so designed that not only the initial pressure delivered to the various parts of the suit may be independently regulated but also the increase of pressure over this minimum may be variably regulated according to the increase in the value of centrifugal force to which the mechanism is subjected.

As shown in Fig. 3 of the drawings there is provided a controlling valve structure designated generally by the numeral 60 and three substantially identical regulating valve structures designated generally by the numerals 61, 62 and 63. It will be, of course, understood that the number of these regulating valves may be varied, if desired, according to the number of bladders employed in the aviator's suit for which independent regulation is desired.

The controlling valve structure 60 comprises a chamber 64 having an inlet port 65 for air under pressure and an outlet port 66 controlled by a valve 67 secured to a valve stem 68 which carried at its lower end a weight 69. Connected to this weight is one end of a collapsible bellows 70, the other end of which is secured to the lower portion of a sleeve 71 through which the valve stem loosely extends. This sleeve is secured in a partition 72 which forms the bottom of the chamber 64.

The port 66 provides communication between the chamber 64 and the space 73 provided within a cap 74 secured upon the main casting or body portion 75 of the structure. A passage 76 is provided through this casting which communicates with a vent or dump trough 77 extending lengthwise below the casting 75, which trough may communicate with the atmosphere at the point 78. It will be apparent, therefore, that when the valve is in the position shown in Fig. 3, the valve chamber 64 will be vented to the atmosphere through chamber 73, passage 76 and trough 77. However, when centrifugal force acts upon the weight 69 in a direction to move it away from the port 66, the valve 67 will be drawn downwardly to a seated position on this port and thus close the latter and prevent the venting of the chamber 64. Below the weight 69 is a compression spring 79, opposing the weight, the tension of which spring may be regulated by the screw 80 to regulate the amount of centrifugal force required to seat the valve 67. This valve will also be subject to a closing force due to the existence of air under pressure within the collapsible bellows 70, which air tends to expand this bellows and thus seat the valve 67. When the valve 67 is closed, the pressure air within the chamber 64 will be conveyed to the regulating valve structures 61, 62 and 63 as will be presently described.

The casting 75 is provided with a plurality of chambers 81, three in number (Fig. 5). As shown, there is one for each of the regulating valve structures 61, 62 and 63. Each of these chambers is provided with a port 82 leading into the trough 77 to vent the chambers 81 to the atmosphere. Controlling the ports 82 are valves 83 at the lower ends of valve stems 84. The valves 83 are regulated and controlled in exactly the same manner as the valve 40 previously described, and the controlling mechanism of each is the same except that the gravity-actuated weights 85, 86 and 87 are of different values so that variation will be obtained in the effect of centrifugal force upon these weights. Each of the valve structures is, of course, capable of individual adjustment so that the initial pressures obtaining in one of the chambers 81, when the corresponding valve 83 is closed, may vary from that obtaining in the other chambers under similar conditions. It will also be apparent that as the value of the weights 85, 86 and 87 vary, the increase in pressure obtaining in one of the chambers 81 due to an increase in centrifugal force will vary with relation to the increase in pressure in the other chambers under the same increase in the value of centrifugal force.

As shown in Fig. 5 of the drawings, the chamber 64 is connected with each of the chambers 81 by the passages 88, 89 and 90, so that when the port 66 is closed by the valve 67, pressure fluid will be delivered to the chambers 81 through these passages which are formed in the casting 75.

Also as illustrated in Fig. 5, each of the chambers 81 has a passage 91 leading therefrom, which passages terminate in ports 92 provided in a boss 93 on the casting 75. Flexible tubes 94 may be secured to the boss 93 to communicate with the ports 92 respectively and convey air under pressure to desired points of delivery such, for example, as three different bladders in an aviator's suit which it is desired to inflate independently or with various degrees of pressure.

It will be apparent that the form of our invention shown in Figs. 3, 4 and 5 of the drawings acts on the same principle as that shown in Figs. 1 and 2 in that, in each case, there is a controlling valve to control the delivery of fluid under pressure to a regulating valve structure which in turn regulates the degree of pressure delivered to a desired point according to the value of centrifugal force to which the mechanism is subjected. In the structure shown in Figs. 3, 4 and 5 of the drawings, however, there are provided three of these regulating valves, each of which receives pressure fluid from the controlling valve when the centrifugal force reaches a given value, and each of which independently regulates and delivers this pressure fluid to separate points of delivery so that the pressure delivered to one of these points may be kept at any desired value independently of that delivered at the other points.

Moreover, the control valve 67 is also in this form of our invention actuated by the action of centrifugal force in that it normally stands in open position and, in such position, the air in chamber 64 is vented to the atmosphere. However, when the value of centrifugal force reaches a given minimum, its action upon the weight 69 will cause the valve 67 to close, thereby preventing the venting of chamber 64 to cause delivery of pressure air through the passages 88, 89 and 90 to the individual valve chambers 81 of the regulating valves 61, 62 and 63. In view of the fact that the action of each of the regulating valves is similar to the action of the one described in connection with Figs. 1 and 2, it is believed that the operation of this form of device will be understood without further description.

While we have shown and described some preferred embodiments of our invention, it will be understood that it is not to be limited to all of the details shown, but is capable of modification and variation within the spirit of the invention and within the scope of the claims.

What we claim is:

1. In a fluid pressure control mechanism, means providing a plurality of chambers each having a vent port, means including a valve actuated by centrifugal force and controlling the admission of a fluid under pressure to said chambers, and means for independently controlling the delivery of fluid from each of said chambers under different degrees of pressure, said last-named means comprising a valve for each chamber controlling the vent port thereof, means biasing each of said valves toward closed position, and said means being regulatable to vary the pressure of the fluid delivered from each of said chambers.

2. In a fluid pressure control mechanism, means providing a plurality of chambers, means including a valve actuated by centrifugal force and controlling the admission of a fluid under pressure to said chambers, a plurality of centrifugally operated valves for independently controlling the delivery of fluid from said chambers under predetermined degrees of pressure, weight means biasing each of said valves in one direction, and a collapsible bellows exposed to the fluid pressure in the associated chamber urging each of said valves in the other direction.

3. Means for inflating the bladder of an aviator's suit or the like comprising a valve casing having a chamber, inlet means for the chamber connected to a source of fluid pressure, a second chamber, means providing communication between said chambers, a valve controlling such communication, means normally urging said valve to closed position, a weight normally acting to open said valve, said second chamber having an outlet port, said second chamber also having a vent port, and a valve responsive to the action of centrifugal force and to pressure within the chamber to control the opening and closing of the vent port.

4. In a fluid-pressure-control mechanism for delivering fluid under predetermined pressure to a receptacle, means providing a chamber adapted to contain a fluid under pressure, means to convey such fluid to a point of delivery, a vent port for said chamber, a valve controlling said port, a collapsible bellows exposed to the pressure obtaining within the chamber for opening said valve, a spring opposing the action of the bellows, a weight opposing the action of said bellows whereby the pressure necessary to move said valve varies with the force of acceleration to which the weight is subjected, a second chamber connected to a source of fluid pressure and adapted to be placed in communication with said first chamber, a valve controlling such communication, and a weight normally urging said last-named valve to open position.

5. In a fluid-pressure-control mechanism, a chamber, inlet means connecting said chamber to a source of fluid under pressure, valve means controlling said inlet means, said valve means being responsive to the action of centrifugal force to introduce fluid pressure into said chamber, said chamber having an outlet port and a vent port, and means responsive to the action of centrifugal force and to pressure within the chamber to control said vent port.

6. In a fluid-pressure-control mechanism, a chamber, inlet means connecting said chamber to a source of fluid under pressure, valve means controlling said inlet means, said valve means being responsive to the action of centrifugal force to introduce fluid pressure into said chamber, said chamber having an outlet port and a vent port, a valve controlling said vent port, a weight normally urging said valve to closed position, and a collapsible bellows exposed to pressure within the chamber to move the valve to open position.

7. A valve casing having inlet means, outlet means, a port providing communication therebetween, a valve controlling said port, means responsive to the action of centrifugal force to effect movement of said valve, a chamber to which said outlet means is connected, said chamber having an outlet port, valve means responsive to the action of centrifugal force and to the pressure obtaining within the chamber to control said last-named port, weight means biasing said valve means to closed position, and a collapsible bellows exposed to pressure in the chamber urging said valve means to open position.

8. In a device of the class described, means to convey air under pressure from a source of supply to a receptacle therefor, means responsive to the action of centrifugal force to divert said air from said receptacle to a second receptacle, means for regulating the pressure of the air delivered to said second receptacle according to the value of centrifugal force to which the device is subjected, said last-mentioned means comprising a chamber communicating with the second receptacle and having a vent port, and a weighted valve controlling said port.

9. In a fluid pressure control mechanism, means providing a plurality of chambers each having a vent port, means including a valve actuated by centrifugal force and controlling the admission of a fluid under pressure to said chambers, means for independently controlling the delivery of fluid from each of said chambers under different degrees of pressure, said last-mentioned means including a valve for each chamber controlling the vent port thereof, and weight means urging said valve to closed position.

10. In a system for preventing an unnatural blood distribution within a human body which is subjected to forces set up when said body is accelerated in space, and having means adapted normally to engage loosely a portion of the human body and adapted, when actuated, to effect a pressure against the blood-carrying vessels of said body; the improvement which consists in the provision of a device for controlling said means automatically, said device comprising, a control element mounted for rectilinear movement and being movable in one direction in response to acceleration forces thereby to actuate said first mentioned means, means automatically to move said control element in the opposite direction upon the cessation of said acceleration forces thereby to enable the return of said first mentioned means to its normal condition, and a second control element mounted for rectilinear movement and being movable in one direction in response to said acceleration forces and in the opposite direction in response to the forces exerted upon said first mentioned means, the movement of said second control element being effective to vary the pressure exerted by said first mentioned means in a ratio proportional to the magnitude of said acceleration forces.

11. Means for inflating the bladder of an aviator's suit or the like comprising a valve casing having a chamber, inlet means for the chamber connected to a source of fluid pressure, a second chamber, means providing communication between said chambers, a valve controlling such communication, means normally urging said valve to closed position, a weight normally acting to open said valve, said second chamber having an outlet port, and means responsive to centrifugal force and to the pressure within the second chamber to control passage of fluid through said port.

IRVING R. VERSOY.
ANTHONY D. RAPUANO.

REFERENCES CITED

The following references are of record in the file of this patent:

UNITED STATES PATENTS

| Number | Name | Date |
|---|---|---|
| 147,604 | Casement | Feb. 17, 1874 |
| 235,186 | Watts | Dec. 7, 1880 |
| 384,967 | Faulkner | June 26, 1888 |
| 1,737,588 | Hopkins | Dec. 3, 1929 |
| 2,159,785 | Down | May 23, 1939 |
| 2,163,731 | Hallot | June 27, 1939 |
| 2,309,591 | Horton | Jan. 26, 1943 |

FOREIGN PATENTS

| Number | Country | Date |
|---|---|---|
| 122,398 | Great Britain | Oct. 29, 1919 |